United States Patent
Bulan et al.

(10) Patent No.: US 6,838,408 B2
(45) Date of Patent: Jan. 4, 2005

(54) METHOD FOR PRODUCING GAS DIFFUSION ELECTRODES

(75) Inventors: Andreas Bulan, Langenfeld (DE); Fritz Gestermann, Leverkusen (DE); Hans-Dieter Pinter, Wermelskirchen (DE); Peter Weuta, Leverkusen (DE); Walter Klesper, Bergisch-Gladbach (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 10/815,711

(22) Filed: Apr. 2, 2004

(65) Prior Publication Data

US 2004/0182695 A1 Sep. 23, 2004

Related U.S. Application Data

(63) Continuation of application No. PCT/EP02/10493, filed on Sep. 19, 2002.

(30) Foreign Application Priority Data

Oct. 2, 2001 (DE) .......................................... 101 48 599

(51) Int. Cl.⁷ ................................................. H01M 4/88
(52) U.S. Cl. ........................ 502/101; 204/283; 204/284; 429/40; 429/41; 429/42; 429/44
(58) Field of Search ................................. 204/283, 284; 429/40, 41, 42, 44; 502/101

(56) References Cited

U.S. PATENT DOCUMENTS

| | | | | |
|---|---|---|---|---|
| 4,129,633 A | * | 12/1978 | Biddick | 264/40.3 |
| 4,317,789 A | * | 3/1982 | Groult et al. | 264/105 |
| 4,336,217 A | | 6/1982 | Sauer | |
| 4,339,325 A | * | 7/1982 | Solomon et al. | 204/296 |
| 4,350,608 A | * | 9/1982 | Gestaut | 502/101 |
| 4,892,637 A | | 1/1990 | Sauer et al. | |
| 5,935,643 A | * | 8/1999 | Song et al. | 427/115 |
| 6,627,035 B2 | * | 9/2003 | Fan et al. | 156/308.2 |
| 6,780,388 B2 | * | 8/2004 | Masuko et al. | 423/449.1 |

FOREIGN PATENT DOCUMENTS

| | | |
|---|---|---|
| DE | 2941774 A1 | 4/1981 |
| DE | 3710168 A1 | 10/1988 |
| DE | 3722019 A1 | 1/1989 |
| EP | 0297377 B1 | 1/1989 |
| WO | WO-01/71830 A2 | 9/2001 |
| WO | WO-03/044245 A2 | 5/2003 |

* cited by examiner

*Primary Examiner*—Bruce F. Bell
(74) *Attorney, Agent, or Firm*—Connolly Bove Lodge & Hutz LLP

(57) ABSTRACT

A method for producing gas diffusion electrodes, in particular for use in electrolysis cells, as well as electrodes and their uses are described. A method of the present invention involves first, a sheet-like structure is produced by means of a pair of rolls by rolling a powder mixture containing at least one catalyst or a catalyst mixture and a binder, and then the sheet-like structure is connected to an electrically conductive catalyst support by rolling by means of a pair of rolls. In one embodiment the clamping force of the rolls is preferably kept constant in the range from 0.2 kN/cm to 15 kN/cm.

20 Claims, No Drawings

METHOD FOR PRODUCING GAS DIFFUSION ELECTRODES

CROSS REFERENCE TO RELATED APPLICATIONS

This is a continuation of PCT/EP02/10493 filed on Sep. 19, 2002, which claims priority to DE 10148599.9 filed Oct. 2, 2001, the contents of both being incorporated herein by reference in their entireties.

BACKGROUND OF THE INVENTION

1. Field of the Invention

The present invention relates generally to a method for producing gas diffusion electrodes which include at least an electrically conductive catalyst support and a sheet-like structure produced by rolling a powder mixture. The powder mixtures generally contain at least one catalyst or a catalyst mixture and a binder.

2. Description of Related Art

DE-A 37 10 168 and EP-A 297 377 describe the production of gas diffusion electrodes by rolling dry powder mixtures containing a compound of the catalyst material, for example silver(I) oxide, and polytetrafluoroethylene (PTFE) as a binder. After the rolling of the powder mixture to give a sheet-like structure, the latter is applied to or rolled in a mechanical support which serves for supplying current to or conducting current away from the electrode. The mechanical support may be, for example, a metal net, nonwoven metal fabric or woven metal fabric or a carbon net, nonwoven carbon fabric or woven carbon fabric. The application of the sheet-like structure to the mechanical support can be effected, for example, by pressing or rolling.

Properties of sheet-like structures which are produced by rolling the powder mixtures are dependent on a multiplicity of parameters. In addition to the powder characteristics themselves, these parameters include, inter alia, the geometry and the surface characteristics of the rolls, the speed of the rolls, the precision of the bearings used, the accuracy of the bearings running on one hand, and the accuracy of the rolls on the other hand, the roll nip, and the clamping force of the rolls, to name a few. If, for example, the roll nip varies drastically during the rolling process, sheet-like structures whose thickness and density are not sufficiently homogeneous are obtained. If, on the other hand, the roll nip is kept substantially constant, for example, by using an excessively high clamping force, the electrodes exhibit, inter alia, very disproportionate voltage increases with increasing current density, as well as poor electrochemical activity during operation. Furthermore, excessively thick and mechanically unstable sheet-like structures generally cannot be used for further processing. Regarding the technical handling properties, such sheet-like structures generally should have a length of from 2 to 3 meters and a width of from 30 to 40 cm in order to be suitable for use as a gas diffusion electrode for electrochemical production of chlorine from aqueous solutions of alkali metal chloride.

For stability reasons, commercial rolls having a width of about 40 cm preferably have diameters of about 15 cm or more, depending on the maximum clamping forces to be applied. It was found that sheet-like structures which were produced with such rolls and were used as gas diffusion electrodes often did not have sufficient electrochemical activity. Particularly, this greatly increases, the operating costs of electrolysis cells and the like. The electrochemical activity is insufficient, for example, if the electrode has a cell voltage of over 2.5 V at a current density of 4 kA/m$^2$.

SUMMARY OF THE INVENTION

It was an object of the instant invention to provide a method for producing gas diffusion electrodes, wherein electrochemically active sheet-like structures having high homogeneity with respect to density, and small thickness variations can be produced. Gas diffusion electrodes generally should have good electrochemical activity and mechanical stability. The parameters of the rolling process should advantageously be chosen so that, during rolling of the powder mixture to give a sheet-like structure, optimum or at least improved electrochemical activity can be achieved. Moreover, the electrochemical activity is generally not adversely affected during application of the sheet-like structure to the catalyst support by rolling.

These and other object can be achieved, according to the invention, inter alia, by providing a method for producing gas diffusion electrodes, suitable for use in electrolysis cells, comprising: producing a sheet-like structure using a pair of rolls by rolling a powder mixture comprising at least one catalyst or a catalyst mixture and a binder, and connecting the sheet-like structure to an electrically conductive catalyst support by rolling using the pair of rolls. The clamping force of the rolls is generally maintained in a range from about 0.2 kN/cm to about 15 kN/cm.

In further accordance with the present invention there is provided a method for producing gas diffusion electrodes, suitable for use in electrolysis cells, comprising:

producing a sheet-like structure using a pair of rolls by rolling a powder mixture comprising at least one catalyst or a catalyst mixture and a binder, and connecting the sheet-like structure to an electrically conductive catalyst support using the pair of rolls. The diameter of the rolls, independently of one another, is preferably not less than about 8 cm and not more than about 15 cm.

In yet further accordance with the present invention, there is provided a method for producing gas diffusion electrodes, suitable for use in electrolysis cells, comprising: producing a sheet-like structure using a pair of rolls by rolling a powder mixture containing at least one catalyst or a catalyst mixture and a binder, and connecting the sheet-like structure to an electrically conductive catalyst support using the pair of rolls. The sheet-like structure is applied to the catalyst support by rolling, and further the rolling is generally effected under a nip force of from about 0.1 kN/cm to about 2 kN/cm.

The present invention is further directed to gas diffusion electrodes and their manufacture and use, and in particular to a gas diffusion electrode having a voltage of less than 2.45 V at a current density of 4 kA/m$^2$, wherein the electrode has been produced by rolling a dry powder.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

DETAILED DESCRIPTION OF A PREFERRED EMBODIMENT

In a first preferred embodiment of an advantageous method according to the invention, a sheet-like structure can be produced, for example, by rolling a powder mixture which contains at least one catalyst or a catalyst mixture and a binder. According to an embodiment of the present invention, the clamping force of the rolls is preferably kept constant, e.g. in the range from 0.2 kN/cm to 15 kN/cm during the rolling process of the powder mixture. It is particularly preferable to provide a clamping force in the range from 0.2 kN/cm to 10 kN/cm, more preferably from 0.2 kN/cm to 5 kN/cm and even more particularly preferably from 0.2 kN/cm to 2 kN/cm. Particularly good results were obtained when the clamping force was kept in the range from 0.3 kN/cm to 0.6 kN/cm.

The clamping force can be generated by any known means, e.g. hydraulically and/or mechanically and/or pneumatically. It is advantageous that the clamping force be adjustable, preferably such that the clamping force can be very finely adjusted as desired for any reason.

In a second preferred embodiment of the method according to the invention, rolls whose diameter is preferably not less than 8 cm and preferably not more than 15 cm, more preferably not more than 13 cm, and particularly preferably not more than 11 cm can be used.

In a third preferred embodiment of the method according to the invention, the sheet-like structure produced by rolling is also connected to an electrically conductive support by rolling. Rolling can be effected for example, under a nip force of preferably from 0.1 kN/cm to 2 kN/cm.

A combination of the three preferred embodiments of the method according to the invention is particularly preferred in some instances.

An important aspect of the present invention is that a lower clamping force should generally be applied during rolling when a smaller diameter roll is employed. Thus, there is typically at least one specific optimal operating range for each roll diameter with regard to the clamping force and the resulting thickness and density of the sheet-like structure. For example, it is generally not possible to produce a sheet-like structure having a thickness of 0.35 mm and a density of 4.4 g/ml using a roll diameter of 13 cm and a clamping force of 1.5 kN/cm. This is possible when a smaller roll diameter is employed.

It was surprisingly found that, under conditions according to the invention for rolling the powder mixture, sheet-like structures can be obtained from which electrodes having sufficient mechanical stability and electrochemical activity can be produced.

The sheet-like structure for gas diffusion electrodes which is produced with the aid of the method according to the invention has high homogeneity. It is possible to achieve density variations which are in the range from about ±0.2 to about ±0.5 g/m$^3$. Furthermore, it is possible with the aid of the method according to the invention to produce sheet-like structures whose thickness variations range from about ±0.05 mm to ±0.2 mm.

The electrochemical activity of the electrode is to be understood as meaning, in addition to the voltage at a specific current density, the change in the voltage at higher current densities and the gas and liquid permeability during operation. With a good electrode, the electrolysis can be operated at high current densities and low voltage, and the increase in the voltage on increasing the current density is relatively small. Thus, for example, the electrolysis of a sodium chloride solution, in which chlorine is evolved at the anode and oxygen is consumed and sodium hydroxide solution is formed at the cathode, can typically be operated at a current density of 4 kA/m$^2$ with a voltage of less than about 2.45 V, preferably less than about 2.5 V. Ideally, the electrode allows little or no gas to pass through from the gas side into the liquid space and, conversely, little or no liquid into the gas space.

A preferable dry powder mixture for the material of the sheet-like structure may comprise a binder, for example, a polymer, such as polytetrafluoroethylene (PTFE), and a catalyst or a catalyst mixture. It is also possible for one of the components of the powder mixture to be carbon or a carbon-containing compound. The powder mixture may also contain additives, such as, for example, ammonium bicarbonate, which acts, inter alia, as a pore former. The catalyst or the catalyst mixture may comprise, for example, nonmetallic compounds of a metal forming the catalyst and/or mixtures of metal and of nonmetallic compounds of a metal forming the catalyst. It is also possible to use mixtures of different metals or metal compounds, preferably noble metals. Silver(I) oxide or mixtures of silver(I) oxide and silver metal can be preferably used as the catalyst in some instances. A Teflon powder from DYNEON®, type 2053, can preferably be used as the binder in some instances. The mixture of binder and catalyst or catalyst mixture can be milled, for example, as described in DE-A 2 941 774, the content of which is incorporated herein by reference, using a high-speed mill with beater knives. The moisture content of the powder mixture is typically not more than 0.5% by weight of $H_2O$ in many embodiments, preferably not more than 0.3% by weight of $H_2O$.

Rolling of the powder mixture can be effected using any method, e.g. using commercial roll shells, as used for production of such sheet-like structures or in the compacting of powders. The individual rolls may have the same or different diameters. It is also possible for the rolls to run at the same or different speeds. The roll surfaces should generally have a roughness at which the powder mixture can still be drawn in at uniform speed if desired. An aim is to produce a homogeneous sheet-like structure. The surface roughness of the roll can be adapted according to the desired properties of the resultant powder mixture. Smooth roll surfaces are preferably employed, i.e. surfaces which do not have a coarse structure. The surface roughness of the roll, measured as the Ra number, is can advantageously be between 0.05 μm and 1.5 μm in many embodiments.

Further parameters which may influence the draw-in behavior of the powder mixture, in addition to the properties of the powder mixture itself, include, for example, the speed of the roll, the roll nip set and/or any combination of a plurality of parameters.

Rolling of the dry powder mixtures can be conducted if desired, in such a way that the distance between the two rolls is adjusted to a specific value, e.g. about 0.2 mm, before rolling. The roll nip set can be chosen according to the desired powder characteristics, the surface roughness of the rolls, the speed of the roll and the diameter of the roll, so that the sheet-like structure produced has a thickness of advantageously from 0.05 to 0.7 mm in some embodiments. The thickness of the sheet-like structure can preferably range from 0.15 to 0.6 mm in some embodiments. Depending on the powder and on the powder characteristics, for example, the roll nip for achieving the above thicknesses of the sheet-like structure preferably range from 0 to about 0.30 mm, in particular from about 0.005 to about 0.2 mm. Thereafter, the dry powder mixture can be metered onto the roll nip, and the roll draws in the powder and compacts it to a sheet-like structure. Since, according to an embodiment of the invention, the clamping force is preferably maintained constant (or at least substantially constant) during rolling, the preset roll nip may expand slightly on drawing in the powder material and may vary slightly during the rolling process, depending on the amount and characteristics of the powder material being drawn in. The roll nip may vary in a range from ±0.05 to ±0.2 mm in some embodiments.

For carrying out a method according to the invention, it may be advantageous if the bearing play of the bearings holding the rolls is small, e.g. if the bearings used have a bearing play of, preferably, less than 0.06 mm, and an accuracy of running of less than 50 µm, and if the rolls preferably originate from a production series possessing high precision. This applies not only to the bearing play of the bearings and bearing blocks used, but preferably also to any or all parts where the bearings are mounted in the roll stand, if these part(s) influence the roll nip.

If a sheet-like structure is connected to an electrically conductive support by a method according to the invention, on one hand, the sheet-like structure can be connected to the support so firmly that it has low-resistant contact with the support and thus, it typically cannot be detached therefrom. On the other hand, the pore system of the sheet-like structure is typically not destroyed by a method of the present invention, thus, sufficient electrochemical activity is ensured. An advantageous electrically conductive support can comprise, for example, a metal net, a nonwoven metal fabric, a woven metal fabric or a metal foam. Expanded metals may also be used. The support preferably comprises nickel or nickel-plated metal compounds or nonmetal compounds, for example, carbon. The support typically performs the function of a current distributor.

The application of the electrochemically active sheet-like structure to the electrically conductive support can also be effected, for example, by pressing or other alternative mechanisms if desired for any reason. However, rolling has the advantage that the gas diffusion electrode can be produced in a continuous process and the forces are generally uniformly distributed. The force which is applied during rolling depends on the support. The greater the mesh size of the metal net and the smaller the thickness of the metal wire, the lower the force generally required. The same applies to expanded metals, in which the required force decreases with increasing mesh size and mesh width, but with decreasing web thickness.

In a preferred embodiment, the electrically conductive support can be connected mechanically and in an electrically conductive manner to a gas-permeable, metallic baseplate, in order to ensure mechanical stability of the gas diffusion electrode. The baseplate comprises, in particular, nickel or a nickel alloy, e.g. a nickel-silver alloy. It preferably has a multiplicity of orifices, for example slots or holes, for passing through the reaction gas. The more stable the support or the support provided with a baseplate, the greater the extent to which it may be deformed during rolling. Deformation can be avoided or reduced by various mechanisms, for example, different circumferential speeds can be used for the two rolls.

The temperature of the sheet-like structure and/or of the electrically conductive catalyst support during the rolling process is preferably from about 5 to about 70° C. In order to maintain this temperature range, thermostatable roll shells can preferably be used. The roll shells are generally hollow to permit passage of a cooling or heating medium. It is particularly preferable if the rolls are cooled during rolling, since the powder compaction heats up the powder due to frictional forces. The rolls may optionally also be heated at the beginning of the rolling process in order to reach the operating temperature or optionally may be thermostated at an elevated temperature. If the roll shells are produced from solid material and cannot be thermostated, the powder mixture to be rolled is generally brought to the desired temperature before rolling.

The speed of the roll is typically freely selectable within certain ranges, provided that the powder is drawn in homogeneously by the rolls. Particularly preferred, however, are circumferential speeds of the rolls which are in the range from about 0.05 to about 19 m/min, in particular from about 0.1 to about 15 m/min.

The gas diffusion electrodes produced by a method according to the invention can be used for any end use, typically in an electrolysis process, in particular for electrolysis of an aqueous solution of sodium chloride.

EXAMPLES

Sheet-like structures for a gas diffusion electrode which were produced according to the following examples were used in a chloralkali electrolysis. A cell which included an anode space and, separated by an ion exchange membrane, a cathode space was used for this purpose. A sodium chloride solution which had a concentration of 200 g/l and was reacted to give chlorine at a ruthenium oxide-coated titanium electrode was used in the anode space. The cathode space was separated from the anode space by a cation exchange membrane from DuPont, type Nafion® 982. Between the gas diffusion electrode and cation exchange membrane was an electrolyte gap in which an approx. 32% strength sodium hydroxide solution was circulated by pumping. Behind the gas diffusion electrode, pure oxygen having a content of 99.9% was passed into the cathode half-cell. Anode area, membrane area and gas diffusion electrode area were each 100 $cm^2$.

The following examples are illustrative and not intended to limit the invention described and claimed herein.

Example 1 (Comparative Example)

A mixture of silver(I) oxide and PTFE in the weight ratio 9:1 was milled using a high-speed beater mill, from IKA, type M20, at intervals of in each case 15 seconds with cooling. This mixture was rolled on a roll mill from Wetzel, comprising 2 roll shells having a width of 40 cm and a diameter of 13 cm with a roll nip of 0.18 mm over a width of 20 cm at a clamping force of 0.075 kN/cm. The circumferential speed was 1.35 m/min and the roughness of the roll surfaces had a Ra number of 25–30 µm. The temperature during the rolling process was 22° C. The sheet-like structure obtained had a thickness of 1.1 mm and was mechanically very unstable. The sheet-like structure could not be applied without destruction to a mechanical support, a nickel net having a nickel wire thickness of 0.14 mm and a mesh size of 0.5 mm. Production of a gas diffusion electrode was therefore not possible.

Example 2 (Comparative Example)

A mixture of silver(I) oxide and PTFE in the weight ratio 9:1 was milled using a high-speed beater mill, from IKA, type M20, at intervals of in each case 15 seconds with cooling. This mixture was rolled on a roll mill from Wetzel, comprising 2 roll shells having a width of 40 cm and a diameter of 13 cm with a roll nip of 0.18 mm over a width of 20 cm at a clamping force of 18 kN/cm. The circumferential speed was 1.35 m/min and the roughness of the roll surfaces had a Ra number of 25–30 µm. The temperature during the rolling process was 22° C. The sheet-like structure obtained had a thickness of 0.19 mm and was mechanically stable. The sheet-like structure could be applied without problems to a mechanical support, a nickel net, having a wire thickness of 0.14 mm and a mesh size of 0.5 mm. The voltage of the electrolysis cell was 2.45 V at a current density of 4 $kA/m^2$. This voltage is substantially too high for technical applications.

Example 3

A mixture of silver(I) oxide and PTFE in the weight ratio 9:1 was milled using a high-speed beater mill, from IKA, type M20, at intervals of in each case 15 seconds with cooling. This mixture was rolled on a roll mill from Wetzel, comprising 2 roll shells having a width of 20 cm and a diameter of 10.8 cm with a roll nip of 0.13 mm over a width of 20 cm at a clamping force of 1.0 kN/cm. The circumferential speed was 1.35 m/min and the roughness of the roll surfaces had a Ra number of 25–30 $\mu$m. The temperature during the rolling process was 22° C. The sheet-like structure obtained had a thickness of 0.35 mm and was mechanically stable. The sheet-like structure could be applied without problems to a mechanical support, a nickel net, having a wire thickness of 0.14 mm and a mesh size of 0.5 mm. The voltage of the electrolysis cell was 2.35 V at a current density of 4 kA/m$^2$.

Example 4

A mixture of silver(I) oxide and PTFE in the weight ratio 9:1 was milled using a high-speed beater mill, from IKA, type M20, at intervals of in each case of 15 seconds, with cooling. This mixture was rolled on a self-designed roll mill, comprising 2 roll shells having a width of 40 cm and a diameter of 10.8 cm with a roll nip of 0 mm over a width of 15 cm at a clamping force of 0.5 kN/cm. The circumferential speed was 1.35 m/min and the roughness of the roll surfaces had a Ra number of 25–30 $\mu$m. The temperature during the rolling process was 22° C. The sheet-like structure obtained had a thickness of 0.35 mm and was mechanically stable. The sheet-like structure could be applied without any problem to a mechanical support, namely, here, a nickel net, having a wire thickness of 0.14 mm and a mesh size of 0.5 mm. The voltage of the electrolysis cell was 2.15 V at a current density of 4 kA/m$^2$.

Example 5

A mixture of silver(I) oxide and PTFE in the weight ratio 9:1 was milled using a high-speed beater mill, from IKA, type M20, at intervals of in each case of 15 seconds, with cooling. This mixture was rolled on a roll mill from Wetzel, comprising 2 roll shells having a width of 40 cm and a diameter of 10.8 cm at a roll nip of 0 mm and a clamping force of 0.5 kN/cm over a width of 30 cm. The circumferential speed was 1.35 m/min and the roughness of the roll surfaces had a Ra number of 25–30 $\mu$m. The temperature during the rolling process was 22° C. The sheet-like structure obtained had a thickness of 0.42 mm and was mechanically stable. The sheet-like structure was rolled on the roll mill onto a nickel net having a mesh size of 0.5 mm and a wire thickness of 0.14 mm so that the resulting nip force was 1 kN/cm. The circumferential speed was 1.3 m/min. The voltage of the electrolysis cell was 2.28 V at a current density of 4 kA/m$^2$.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

What is claimed is:

1. A method for producing gas diffusion electrodes, suitable for use in electrolysis cells, comprising: producing a sheet-like structure using a pair of rolls by rolling a powder mixture comprising at least one catalyst or a catalyst mixture and a binder, and
   connecting the sheet-like structure to an electrically conductive catalyst support by rolling using said pair of rolls, wherein the clamping force of the rolls is maintained in a range from about 0.2 kN/cm to about 15 kN/cm.
2. A method as claimed in claim 1, wherein the diameter of the rolls, independently of one another, is not less than about 8 cm and not more than about 13 cm.
3. A method as claimed in claim 2, wherein the diameter of the rolls, independently of one another, is not less than about 8 cm and not more than about 13 cm.
4. A method as claimed in claim 1, wherein the circumferential speed of the rolls during rolling of the powder mixture, independently of one another, is from about 0.05 m/min to about 19 m/min.
5. A method as claimed in claim 1, wherein the circumferential speed of the rolls during connection of the sheet-like structure to the support, independently of one another, is from about 0.1 m/min to about 12 m/min.
6. A method as claimed in claim 1, wherein the sheet-like structure has a thickness of from about 0.05 mm to about 0.7 mm.
7. A method as claimed in claim 1, wherein the temperature of the sheet-like structure and/or of the catalyst support during the rolling processes is from about 5° C. to about 70° C.
8. A method as claimed in claim 1, wherein the rolls, independently of one another, have a surface roughness of from about 0.05 $\mu$m to about 1.5 $\mu$m.
9. A method as claimed in claim 1, wherein the electrically conductive catalyst support is connected to a gas-permeable, metallic baseplate.
10. A gas diffusion electrode produced according to claim 1.
11. A method for producing gas diffusion electrodes, suitable for use in electrolysis cells, comprising:
    producing a sheet-like structure using a pair of rolls by rolling a powder mixture comprising at least one catalyst or a catalyst mixture and a binder, and
    connecting the sheet-like structure to an electrically conductive catalyst support using said pair of rolls, wherein the diameter of the rolls, independently of one another, is not less than about 8 cm and not more than about 15 cm.
12. A method as claimed in claim 11, wherein the clamping force of the rolls during rolling of the powder mixture is in the range from about 0.2 kN/cm to about 10 kN/cm.
13. A gas diffusion electrode produced according to claim 11.
14. A method for producing gas diffusion electrodes, suitable for use in electrolysis cells, comprising:
    producing a sheet-like structure using a pair of rolls by rolling a powder mixture containing at least one catalyst or a catalyst mixture and a binder, and
    connecting the sheet-like structure to an electrically conductive catalyst support using said pair of rolls, the sheet-like structure is applied to the catalyst support by rolling, and further wherein the rolling is effected under a nip force of from about 0.1 kN/cm to about 2 kN/cm.
15. A method as claimed in claim 14, wherein the clamping force of the rolls during rolling of the powder mixture is in the range from about 0.2 kN/cm to about 10 kN/cm.

16. A gas diffusion electrode produced according to claim 14.

17. A gas diffusion electrode having a voltage of less than 2.45 V at a current density of 4 kA/m$^2$, said electrode having been produced by rolling a dry powder.

18. An electrode of claim 17, wherein said rolling is conducted from under a nip force from about 0.1 kN/cm to about 2 kN/cm.

19. An electrode of claim 17, wherein said electrode is capable of being produced from a sheet-like structure having a density variation from about ±2 to about ±5 g/m$^3$.

20. An electrode of claim 17, which is capable of being produced from a sheet-like structure having a thickness from about ±0.05 to about ±0.02 mm.

\* \* \* \* \*